United States Patent
Diab et al.

(10) Patent No.: US 8,194,548 B2
(45) Date of Patent: Jun. 5, 2012

(54) METHOD AND SYSTEM FOR DUTY CYCLING PORTIONS OF A NETWORK DEVICE BASED ON AGGREGATE THROUGHPUT OF THE DEVICE

(75) Inventors: Wael William Diab, San Francisco, CA (US); Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 373 days.

(21) Appl. No.: 12/200,653

(22) Filed: Aug. 28, 2008

(65) Prior Publication Data

US 2009/0154355 A1 Jun. 18, 2009

Related U.S. Application Data

(60) Provisional application No. 61/014,253, filed on Dec. 17, 2007, provisional application No. 61/014,265, filed on Dec. 17, 2007, provisional application No. 61/014,278, filed on Dec. 17, 2007, provisional application No. 61/014,293, filed on Dec. 17, 2007.

(51) Int. Cl.
*H04J 1/16* (2006.01)

(52) U.S. Cl. .................. 370/235; 370/230.1; 370/311; 370/318

(58) Field of Classification Search ................. 370/465, 370/466, 236, 433, 230.1, 235, 311, 318
See application file for complete search history.

(56) References Cited

U.S. PATENT DOCUMENTS

| | | | |
|---|---|---|---|
| 5,381,450 A | | 1/1995 | Lane |
| 5,596,575 A | * | 1/1997 | Yang et al. ............... 370/468 |
| 5,883,894 A | * | 3/1999 | Patel et al. ............... 370/438 |
| 6,085,248 A | | 7/2000 | Sambamurthy et al. |
| 6,222,852 B1 | * | 4/2001 | Gandy .................. 370/463 |
| 6,442,174 B1 | * | 8/2002 | Lin ..................... 370/466 |
| 6,587,473 B2 | | 7/2003 | Terry et al. |

(Continued)

FOREIGN PATENT DOCUMENTS

EP 1 473 870 11/2004

(Continued)

OTHER PUBLICATIONS

Venkat, "Burst Reduction Properties of the Leaky Bucket Flow Control Scheme in ATM Networks", IEEE Transactions on Communications, vol. 42, No. 12, Dec. 1994, pp. 3085-3088.

(Continued)

*Primary Examiner* — Ricky Ngo
*Assistant Examiner* — Dewanda Samuel
(74) *Attorney, Agent, or Firm* — Farjami & Farjami LLP

(57) ABSTRACT

Aspects of a method and system for duty cycling a network device based on aggregate throughput of the device are provided. In this regard, a limit on aggregate ingress and egress data of a network device during a time interval may be determined. Processing of data by the network device may be duty cycled based on the determination. The device may process data at a first rate during a first portion of the time interval and process data at a second rate during a remaining portion of the time interval. In this regard, portions of the device may be slowed or powered down during the first portion of the time interval. Power consumed by the device during the first portion of the time interval may be less than power consumed by the device during the remaining portion of the time interval.

18 Claims, 6 Drawing Sheets

U.S. PATENT DOCUMENTS

| | | | |
|---|---|---|---|
| 6,731,692 B1 | 5/2004 | Bhoja | |
| 6,791,942 B2 * | 9/2004 | Jin | 370/229 |
| 6,795,450 B1 | 9/2004 | Mills et al. | |
| 6,856,597 B1 | 2/2005 | Scott | |
| 6,965,610 B2 * | 11/2005 | Creigh | 370/465 |
| 6,973,094 B1 * | 12/2005 | Holloway et al. | 370/445 |
| 7,124,330 B2 * | 10/2006 | Wong et al. | 714/43 |
| 7,127,521 B2 * | 10/2006 | Hsu et al. | 709/233 |
| 7,272,114 B1 * | 9/2007 | Barkan | 370/248 |
| 7,278,039 B1 * | 10/2007 | Lo | 713/320 |
| 7,539,887 B2 * | 5/2009 | Hsu et al. | 713/324 |
| 7,573,940 B2 * | 8/2009 | Connor et al. | 375/257 |
| 7,577,857 B1 * | 8/2009 | Henderson et al. | 713/320 |
| 2001/0033611 A1 | 10/2001 | Grimwood | |
| 2002/0136231 A1 | 9/2002 | Leatherbury | |
| 2003/0053493 A1 | 3/2003 | Graham Mobley | |
| 2003/0161348 A1 * | 8/2003 | Mills et al. | 370/509 |
| 2003/0191854 A1 * | 10/2003 | Hsu et al. | 709/233 |
| 2006/0034295 A1 | 2/2006 | Cherukuri et al. | |
| 2006/0140218 A1 | 6/2006 | Winterton | |
| 2007/0127581 A1 * | 6/2007 | Connor et al. | 375/257 |
| 2007/0259629 A1 * | 11/2007 | Lee et al. | 455/127.1 |
| 2007/0280239 A1 | 12/2007 | Lund | |
| 2008/0159304 A1 * | 7/2008 | Ozugur et al. | 370/401 |
| 2008/0201626 A1 | 8/2008 | Sturm | |
| 2008/0225841 A1 | 9/2008 | Conway et al. | |
| 2008/0232243 A1 * | 9/2008 | Oren et al. | 370/216 |
| 2008/0313508 A1 | 12/2008 | Starr | |
| 2009/0097427 A1 | 4/2009 | Diab | |
| 2009/0097442 A1 | 4/2009 | Diab | |
| 2009/0097481 A1 | 4/2009 | Diab | |
| 2009/0097500 A1 | 4/2009 | Diab | |
| 2009/0119524 A1 * | 5/2009 | Hays | 713/322 |
| 2009/0154355 A1 | 6/2009 | Diab | |
| 2009/0154455 A1 | 6/2009 | Diab | |
| 2009/0154490 A1 | 6/2009 | Diab | |
| 2009/0154500 A1 | 6/2009 | Diab | |
| 2009/0154593 A1 | 6/2009 | Diab | |

FOREIGN PATENT DOCUMENTS

| | | |
|---|---|---|
| EP | 1484876 | 12/2004 |
| EP | 1 494 407 | 1/2005 |
| GB | 2337672 | 11/1999 |
| WO | WO 00/31923 | 6/2000 |

OTHER PUBLICATIONS

Bennett et al., "Energy Efficient Ethernet", [Online] IEEE 802 Tutorial, Jul. 16, 2007, http://www.ieee802.org/802_tutorials/july07/IEEE-tutorial-energy-efficient-ethernet.pdf.

Grow, "802.1 and Energy Efficient Ethernet", [Online] Sep. 11, 2007, pp. 1-6, http://www.ieee802.org/3/eee_study/public/sep07/grow_1_0907.pdf.

Teener, "Audio/Video Bridging for Home Networks (IEEE 802.1 AV Bridging Task Group)" [Online] Jun. 1, 2007, http://www.ieee802.org/3/eee_study/public/jul07/teener_1_0707.pdf.

European Search Report for European Patent Application No. 08021205.3-1249, mailed May 6, 2009.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR DUTY CYCLING PORTIONS OF A NETWORK DEVICE BASED ON AGGREGATE THROUGHPUT OF THE DEVICE

CROSS-REFERENCE TO RELATED APPLICATIONS/INCORPORATION BY REFERENCE

This patent application makes reference to, claims priority to and claims benefit from:
U.S. Provisional Patent Application Ser. No. 61/014,253 filed on Dec. 17, 2007;
U.S. Provisional Patent Application Ser. No. 61/014,265 filed on Dec. 17, 2007;
U.S. Provisional Patent Application Ser. No. 61/014,278 filed on Dec. 17, 2007; and
U.S. Provisional Patent Application Ser. No. 61/014,293 filed on Dec. 17, 2007.
This patent application also makes reference to:
U.S. patent application Ser. No. 12/200,402 filed on Aug. 28, 2010;
U.S. patent application Ser. No. 12/200,499 filed on Aug. 28, 2010; and
U.S. patent application Ser. No. 12/200,551 filed on Aug. 28, 2010.
The above stated application is hereby incorporated herein by reference in its entirety.

FIELD OF THE INVENTION

Certain embodiments of the invention relate to a method and system for networking. More specifically, certain embodiments of the invention relate to a method and system for duty cycling portions of a network device based on aggregate throughput of the device.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often results in significant increases in power consumption. In this regard, as an increasing number of portable and/or handheld devices are enabled for Ethernet communications, battery life may be a concern when communicating over Ethernet networks. Accordingly, ways of reducing power consumption when communicating over Ethernet networks may be needed.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for duty cycling portions of a network device based on aggregate throughput of the device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the invention may be found in a method and system for duty cycling portions of a network device based on aggregate throughput of the device. In various embodiments of the invention, a limit on aggregate ingress and/or egress data of a network device during a time interval may be determined. Processing of the data may be duty cycled based on the determination. The device may process the data at a first rate during a first portion of a time interval and process the data at a second rate during a remaining portion of the time interval. In this regard, one or more components, or portions thereof, of the device may be slowed or powered down during the first portion of the time interval. Exemplary components of the device 200 may comprise one or more network port subsystems, switch fabric subsystems, control and/or management subsystems, and/or hosts.

A duration of the time interval may be based on a type of the ingress and egress data. A duration of the time interval may be based on the limit on aggregate throughput of the network device during the time interval. A duration of the first portion of the time interval may be based on the limit on aggregate throughput of the network device during the time interval. Power consumed by the device during the first portion of the time interval may be less than power consumed by the device during the remaining portion of the time interval. The first data rate and the second data rate may each be determined based on the limit on aggregate ingress and egress data of the network device during the time interval. An average rate at which the device processes data during the time interval may be equal, within a tolerance, to limit on aggregate throughput of the network device during the time interval.

Figure 1A:
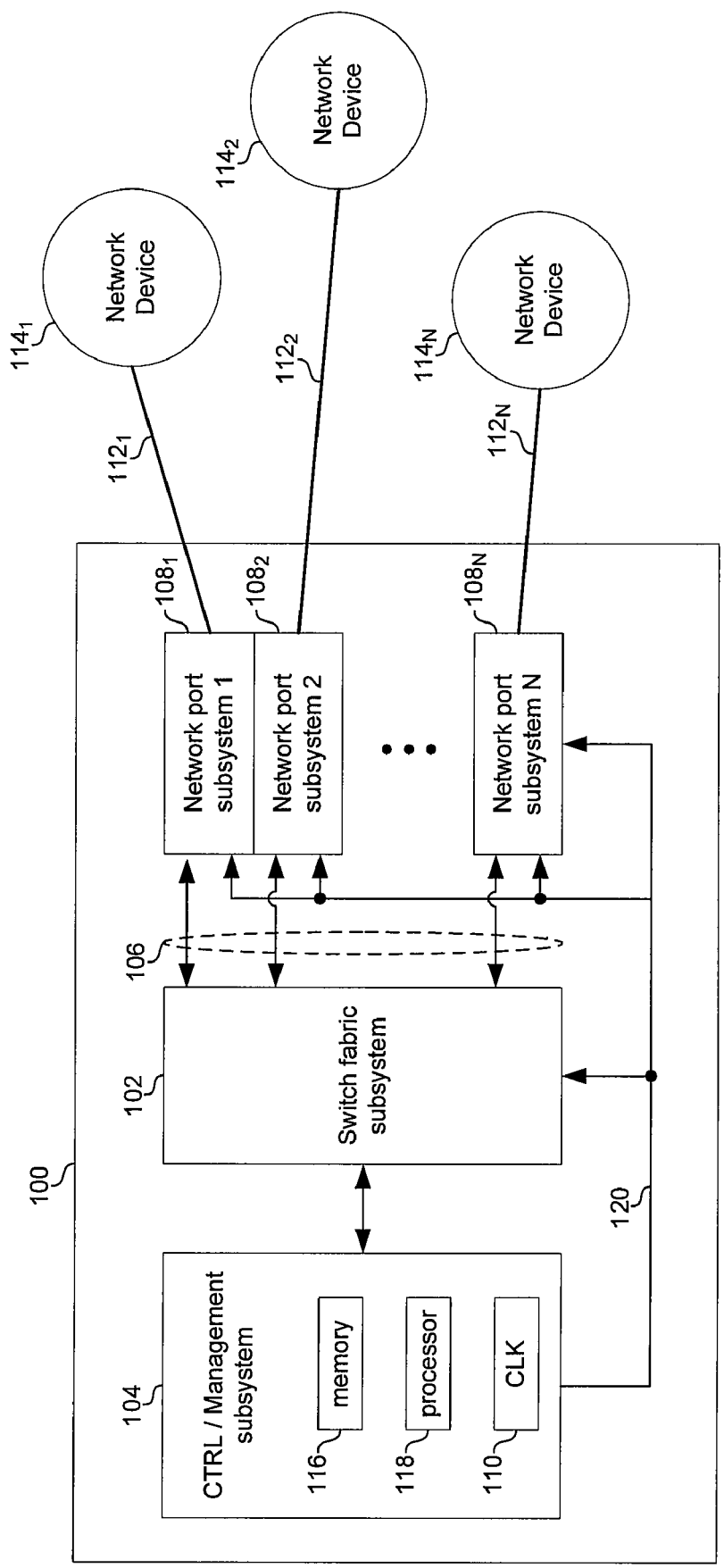
FIG. 1A is a block diagram illustrating an exemplary multi-port device communicatively coupled to a plurality of network devices, in accordance with an embodiment of the invention.

FIG. 1A is a block diagram illustrating a multi-port device communicatively coupled to a plurality of network devices, in accordance with an embodiment of the invention. Referring to FIG. 1, there is shown an N-port device 100 communicatively coupled to devices $114_1, \ldots, 114_N$ (collectively referred to herein as devices 114) via links $112_1, \ldots, 112_N$ (collectively referred to herein as links 112). The N-port device 100 may comprise a control and management subsystem 104, a switch fabric subsystem 102, and a plurality of networking port subsystems $108_1, \ldots, 108_N$.

The control and management subsystem 104 may comprise suitable logic, circuitry, and/or code that may be operable to configure and/or control operations of the N-port device 100. In this regard, the control and management subsystem 104 may provide one or more control signals 120 to one or more portions of the switch fabric subsystem 102 and/or the network port subsystems $108_1, \ldots, 108_N$. Additionally, the control and management subsystem 104 may comprise suitable logic, circuitry, and/or code to enable operability of layer 3, and possibly higher layers, of the OSI model. For example, in instances that the device 100 may be an edge device such as a server or a PC, the control and management subsystem 104 may process data that may be communicated over one or more of the links 112. In an exemplary embodiment of the invention, the control and management subsystem 104 may comprise a processor 118, a memory 116, and a clock 110.

The processor 118 may comprise suitable logic, circuitry, and/or code that may enable processing data and/or controlling operations of the device 100. In this regard, the processor 118 may be enabled to provide control signals 120 to the various other blocks comprising the device 100. The processor 118 may also enable execution of applications programs and/or code. In various embodiments of the invention, the applications, programs, and/or code may enable, for example, configuring the switch fabric subsystem 102 and/or network port subsystems $108_1, \ldots, 108_N$. Additionally, in various embodiments of the invention, the applications, programs, and/or code may enable, for example, generating, parsing, or otherwise processing data.

The memory 116 may comprise suitable logic, circuitry, and/or code that may enable storage or programming of information that includes parameters and/or code that may effectuate the operation of the N-port device 100. The parameters may comprise configuration data and the code may comprise operational code such as software and/or firmware, but the information need not be limited in this regard. Moreover, the parameters may include adaptive filter and/or block coefficients.

The clock 110 may comprise suitable logic circuitry and/or code which may be operable to generate one or more reference signals for supporting operation of the N-port device 100. Although a single clock is illustrated in FIG. 1, the invention is not so limited and the N-port device 100 may comprise a plurality of clocks. Additionally and/or alternatively, one or more derivative clocks may be generated from the clock 110 and may be utilized by one or more portions of the N-port device 100.

The switch fabric subsystem 102 may comprise suitable logic, circuitry, and/or code that may be operable to route data between the network port subsystems $108_1, \ldots, 108_N$. Additionally, in some instances, the switch fabric subsystem 102 may be operable to route data between one or more of the network port subsystems $108_1, \ldots, 108_N$ and the control and management subsystem 104. In various embodiments of the invention, one or more portions of the switch fabric subsystem 102 may be dedicated to one of the network port subsystems $108_1, \ldots, 108_N$. In various embodiments of the invention, one or more portions of the switch fabric subsystem 102 may be shared among a plurality of the network port subsystems $108_1, \ldots, 108_N$. Additionally, various portions and/or resources of the switch fabric subsystem 102 may be dynamically allocated to one or more of the port subsystems $108_1, \ldots, 108_N$ as needed.

Each of the network port subsystems $108_1, \ldots, 108_N$ may comprise suitable logic, circuitry and/or code for communicating data between the switch fabric subsystem 104 and the physical links $112_1, \ldots, 112_N$. In this regard, the network port subsystems $108_1, \ldots, 108_N$ may each enable operability of layer 1, and in some instances layer 2 or higher, of the OSI model. In an exemplary embodiment of the invention, each of the network port subsystems $108_1, \ldots, 108_N$ may comprise, for example, a media access control (MAC) module and a PHY device. In various exemplary embodiments of the invention, each network port subsystems $108_1, \ldots, 108_N$ may comprise one or more transmitters, receivers, filters, echo cancellation blocks, far-end-crosstalk cancellation blocks, and/or near-end crosstalk cancellation blocks. In an exemplary embodiment of the invention, the network port subsystems $108_1, \ldots, 108_N$ may communicate with the switch fabric subsystem 102 via an interface 106 which may, for example, be a PCI or PCI-X bus.

The links 112 may each comprise up to four or more physical channels and the devices 102 may communicate via two or more of the physical channels. For example, Ethernet over twisted pair standards 10BASE-T and 100BASE-TX may utilize two pairs of UTP while Ethernet over twisted pair standards 1000BASE-T and 10GBASE-T may utilize four pairs of UTP.

In operation, data processing capabilities of the N-port device 100 may be duty cycled based on aggregate throughput of the networking port subsystems $108_1, \ldots, 108_N$. Accordingly, based on the aggregate throughput during a time interval, one or more portions of the N-port device 100 may be disabled, powered down, and/or operated at lower frequency for a portion of the time interval and enabled, powered up, and/or operated at higher frequency for a portion of the time interval. Aggregate throughput may refer to the sum of the data rates on the links $112_1, \ldots, 112_N$. The aggregate throughput of the N-port device 100 may depend, for example, on ingress and egress traffic to/from the N-port device 100. Accordingly, one or more portions of the N-port device 100 may be duty cycled between a plurality of configurations such that data processing capacity of the N-port device 100 may match (within a tolerance or range) the amount of data to be processed for transmission and/or reception via the links 112 during the time interval. For example, one or more portions of the control and management subsystem 104, the switch fabric subsystem 102, the network port subsystems $108_1, \ldots, 108_N$, may be duty cycled between a plurality of configurations. In this regard, one or more of the configurations may be a high(er) power configuration in which the device 100 may process data at a high(er) rate and one or more configurations may be a low(er) power configuration in which the device 100 may process data at a low(er) rate. In various exemplary embodiments of the invention, one or more portions of the device 100 may be placed into a "deep sleep" mode during which little or no data may be processed.

In various exemplary embodiments of the invention, 'N' may be any integer greater than or equal to 1. For example, the device 100 may be VOIP phone and 'N' may be 3, the device 100 may be a SMB switch and 'N' may be 5, the device 100 may be an Enterprise switch and 'N' may be 48, or the device may be an aggregation switch and 'N' may be 96.

In various embodiments of the invention, the devices 114 may each comprise, for example, networking devices such as personal computers, wireless local area networking (WLAN) devices, voice over internet protocols (VOIP) devices, handheld devices, servers, switches, routers, and bridges. In various embodiments of the invention, the devices 114 may each comprise, for example, A/V equipment may such as microphones, instruments, sound boards, sound cards, video cameras, media players, graphics cards, or other audio and/or video devices. Additionally, the devices 114 may each be enabled to utilize Audio/Video Bridging and/or Audio/video bridging extensions (collectively referred to herein as audio video bridging or AVB) for the exchange of multimedia content and associated control and/or auxiliary data.

In various embodiments of the invention, the N-port device 100 and/or devices 106 may each comprise suitable logic, circuitry, and/or code that may enable transmission and/or reception at a high(er) data in one direction and transmission and/or reception at a low(er) data rate in the other direction.

In various embodiments of the invention, the N-port device 100 may be enabled to utilize Audio/Video Bridging and/or Audio/video bridging extensions (collectively referred to herein as audio video bridging or AVB) for the exchange of multimedia content and associated control and/or auxiliary data.

In various exemplary embodiments of the invention, one or more of the network port subsystems $108_1, \ldots, 108_N$ may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, one or more of the network port subsystems $108_1, \ldots, 108_N$ may comprise a backplane PHY capable of operating at one or more standard rates such as 10 Gbps (10GBASE-KX4 and/or 10GBASE-KR); and/or non-standard rates such as 2.5 Gbps and 5 Gbps.

In an exemplary embodiment of the invention, one or more of the network port subsystems $108_1, \ldots, 108_N$ may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

In addition, the link partners, one or more of the network port subsystems $108_1, \ldots, 108_N$ may support multi-lane topologies such as 40 Gbps CR4, ER4, KR4; 100 Gbps CR10, SR10 and/or 10 Gbps LX4 and CX4. Also, serial electrical and copper single channel technologies such as KX, KR, SR, LR, LRM, SX, LX, CX, BX10, LX10 may be supported. Non standard speeds and non-standard technologies, for example, single channel, two channel or four channels may also be supported. More over, TDM technologies such as PON at various speeds may be supported by the N-port device 100.

In various embodiments of the invention, the device 100 may reside on one or more printed circuit boards. In this regard, one or more PCBs may be housed and/or communicatively coupled in a fixed or modular configuration. In regards to a modular, or "chassis", approach, the number and type of ports may be configurable.

Figure 1B:
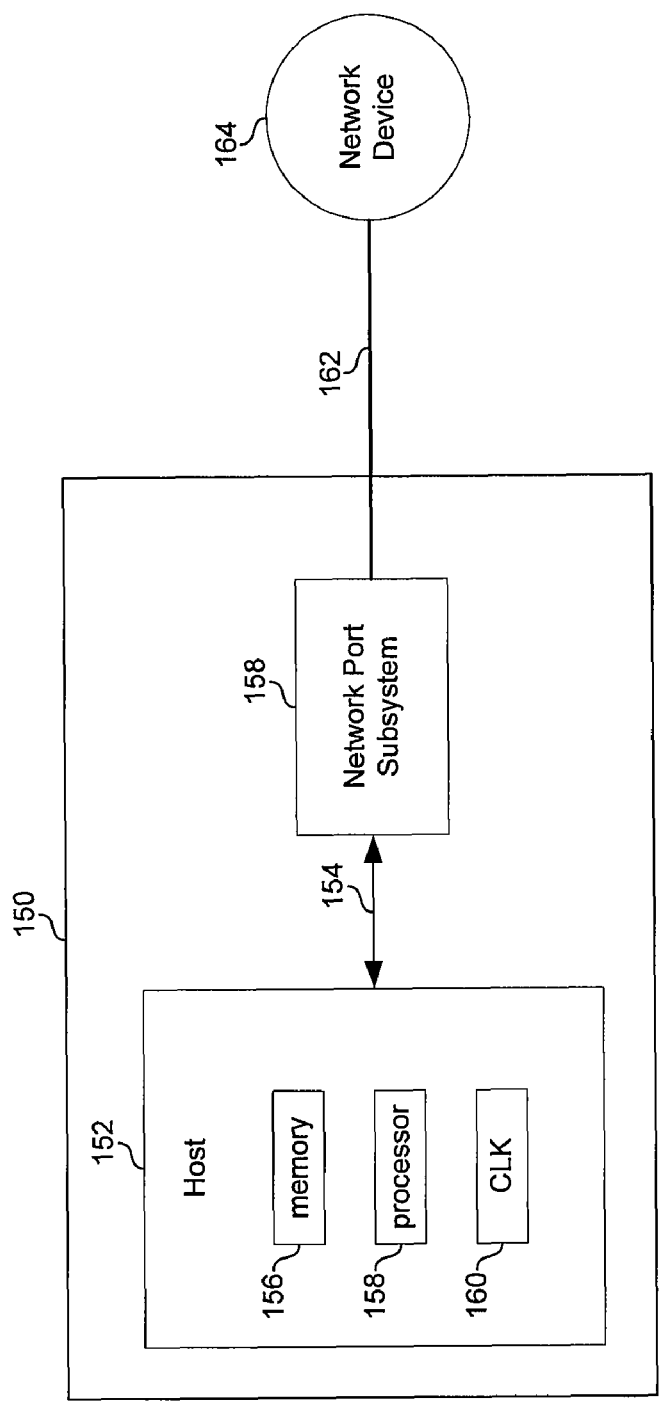
FIG. 1B is a block diagram illustrating an exemplary single-port device, in accordance with an embodiment of the invention.

FIG. 1B is a block diagram illustrating an exemplary single-port device, in accordance with an embodiment of the invention. Referring to FIG. 1B, the single-port device 150 may comprise a host 152 and a network port subsystem 158. The single-port 150 may be similar, or even the same in some cases, to the N-port device 100 described with respect to FIG. 1. In this regard, the N-port device 100 may be more illustrative of a switch, bridge, router, or other device typically found in network core, whereas the single-port device 150 may be more illustrative of a device at the network edge such as a PC or a server.

The host 152 may comprise suitable logic, circuitry, and/or code that may be operable to enable operability of layer 2 and higher of the OSI model. Additionally, the host may comprise suitable logic, circuitry, and/or code that may be operable to perform any of a variety of computing and/or data processing functions. The host 152 may comprise a processor 158, a memory 156, and a clock 160 which may be similar to the processor 118, a memory 116, and the clock 110 described with respect to FIG. 1A.

The network port subsystem 158 may be similar to or the same as one of the network port subsystems $108_1, \ldots, 108_N$ described with respect to FIG. 1A.

The N-port device 100 of FIG. 1 may be primarily a networking device whereas networking may be a secondary function of the device 150. In this regard, the device 150 may utilize its network capabilities to facilitate a primary function which may comprise providing data and/or services to a user. However, even though networking may be a secondary function of the device 150, duty cycling one or more portions of the device 150 based on aggregate throughput of the networking port subsystem 158 may still enable significantly reducing power consumption in the device 150. In this regard, one or more portions of the device 150 associated with the network port subsystem 158 and/or associated with networking functions of the device 150 in general, may be duty cycled between a plurality of configurations. For example, the network port subsystem 158 may communicate with the host 152 via bus 154 (e.g. 154) and traffic exchanged between the network port subsystem 158 and the host 152 may comprise a significant percentage of the transactions on the bus 154. Accordingly, in instances that less data may be communicated over the link 112, the bus 154 and/or its controllers may correspondingly be duty cycled between one or more low(er) speed configurations and one or more high(er) speed configurations. Similarly, portions of the memory 156, which may buffer data communicated between the network port subsystem 158 and the host 152, may be powered down for one or more portions of one or more time intervals during which there may be less data to be communicated between the host 152 and the network port subsystem 158.

Figure 2A:
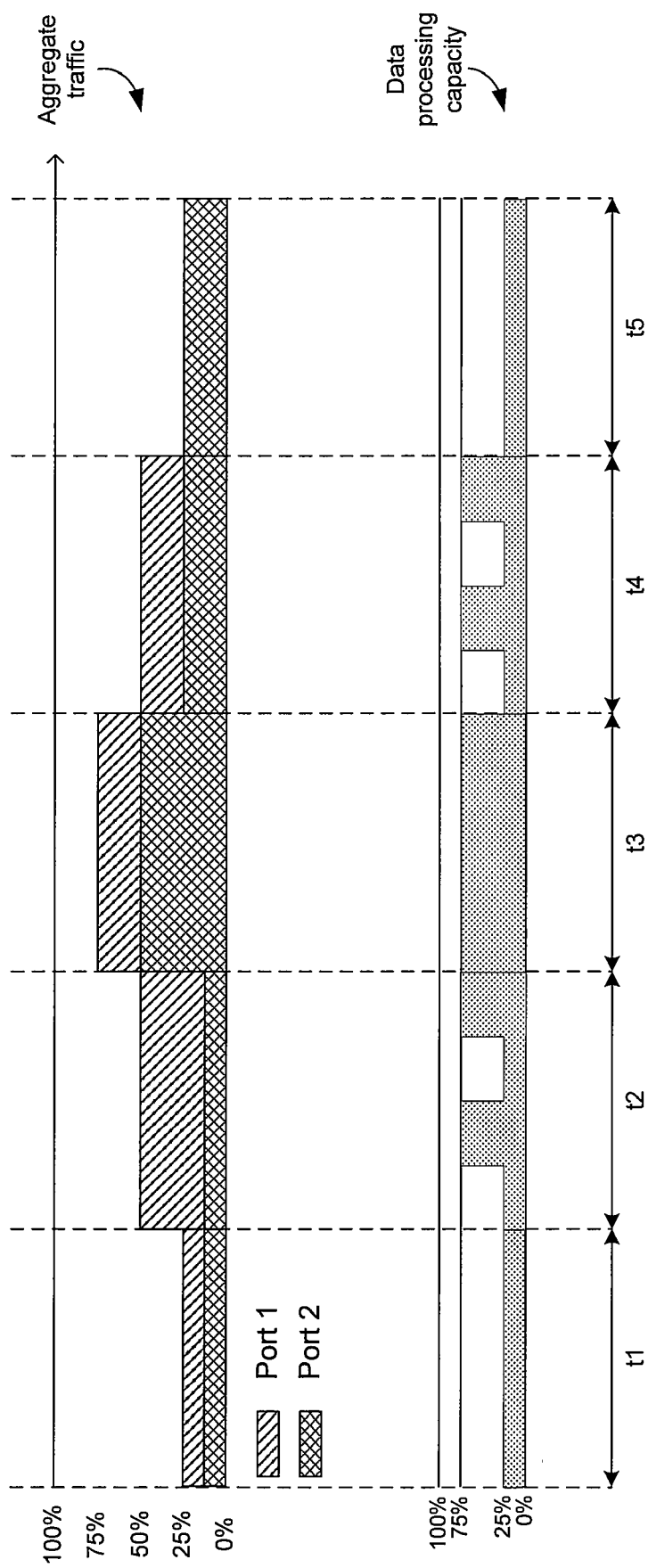
FIG. 2A is a diagram illustrating duty cycling one or more portions of a network device based on aggregate throughput of the device, in accordance with an embodiment of the invention.

FIG. 2A is a diagram illustrating duty cycling one or more portions of a network device based on aggregate throughput of the device, in accordance with an embodiment of the invention. Referring to FIG. 2A, in an exemplary embodiment of the invention, a device may comprise two network ports and may need to process ingress and egress data for both ports. Consequently, to prevent corrupted or lost data, from overflowed or underflowed buffers, for example, the rate at which the device processes data, that is, the device's data processing capacity, may need to keep up with the combined ingress and egress data on the two ports. Accordingly, an aggregate throughput of a device's network ports may be utilized to control operation of one or more portions of the device. In this regard, one or more components, or portions thereof, of the device may be duty cycled during a time interval based on a limit on aggregate throughput of the device during the time interval.

During the exemplary time interval t1, ports 1 and 2 may combine to support up to 25% of the maximum aggregate throughput supported by a network device (M.A.T). Accordingly, one or more components, or portions thereof, of the device may be configured to handle 25% of the M.A.T for 100% of time interval t1. During the exemplary time interval t2, ports 1 and 2 may combine to support up to 50% of the M.A.T. Accordingly, one or more components, or portions thereof, of the device may be configured to handle 25% of the M.A.T for 50% of time interval t2 and configured to handle 75% of the M.A.T for 50% of time interval t2. During the exemplary time interval t3, ports 1 and 2 may combine to support up to 75% of the M.A.T. Accordingly, one or more components, or portions thereof, of the device may be configured to handle 75% of the M.A.T for 100% of time interval t3. During the exemplary time interval t4, ports 1 and 2 may combine to support up to 50% of the M.A.T. Accordingly, one or more components, or portions thereof, of the device may be configured to handle 25% of M.A.T for 50% of time interval t2 and configured to handle 75% of the M.A.T for 50% of time interval t4. During the exemplary time interval t5, ports 1 and 2 may combine to support up to 25% of the M.A.T. Accordingly, one or more components, or portions thereof, of the device may be configured to handle 25% of the M.A.T for 100% of time interval t5.

Figure 2B:
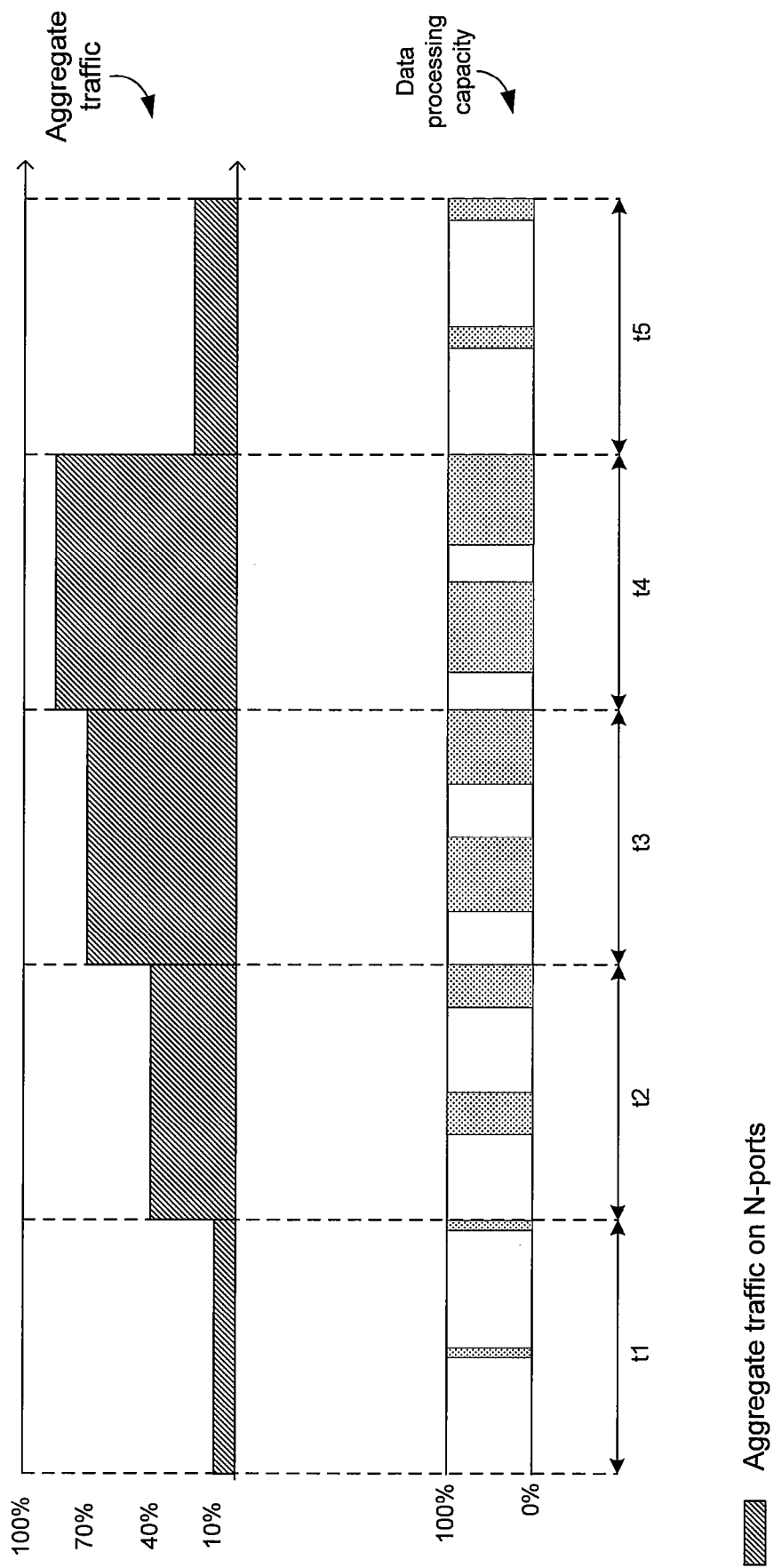
FIG. 2B is a diagram illustrating duty cycling one or more portions of a network device based on aggregate throughput of the device during a time interval, in accordance with an embodiment of the invention.

FIG. 2B is a diagram illustrating duty cycling one or more portions of a network device based on aggregate throughput of the device during a time interval, in accordance with an embodiment of the invention. Referring to FIG. 2B, in an exemplary embodiment of the invention, a device may comprise N ports which may each support a plurality of standard and/or non-standard data rates. To prevent corrupted or lost data, from overflowed or underflowed buffers, for example, the rate at which the device processes data, that is, the device's data processing capacity, may need to keep up with the combined ingress and egress data on the N ports. Accordingly, an aggregate throughput of a device's network ports may be utilized to control operation of one or more portions of the device. In this regard, one or more components, or portions thereof, of the device may be duty cycled during a time interval based on the aggregate throughput of the device during the time interval.

During the exemplary time interval t1, the N ports may combine to support up to 10% of the M.A.T. Accordingly, one or more components, or portions thereof, of the device may be configured to handle 100% of the M.A.T for 10% of time interval t1 and configured to handle 0% of the M.A.T for 90% of time interval t1. During the exemplary time interval t2, the N ports may combine to support up to 40% of the M.A.T. Accordingly, one or more components, or portions thereof, of the device may be configured to handle 100% of the M.A.T for 40% of time interval t2 and configured to handle 0% of the M.A.T for 60% of time interval t2. During the exemplary time interval t3, the N ports may combine to support up to 70% of the M.A.T. Accordingly, one or more components, or portions thereof, of the device may be configured to handle 100% of the M.A.T for 70% of time interval t3 and configured to handle 0% of the M.A.T for 30% of time interval t3. During the exemplary time interval t4, the N ports may combine to support up to 85% of the M.A.T. Accordingly, one or more components, or portions thereof, of the device may be configured to handle 100% of the M.A.T for 85% of time interval t4 and configured to handle 0% of the M.A.T for 15% of time interval t4. During the exemplary time interval t5, ports the N ports may combine to support up to 20% of the M.A.T. Accordingly, one or more components, or portions thereof, of the device may be configured to handle 100% of the M.A.T for 20% of time interval t5 and configured to handle 0% of the M.A.T for 80% of time interval t5.

Figure 2C:
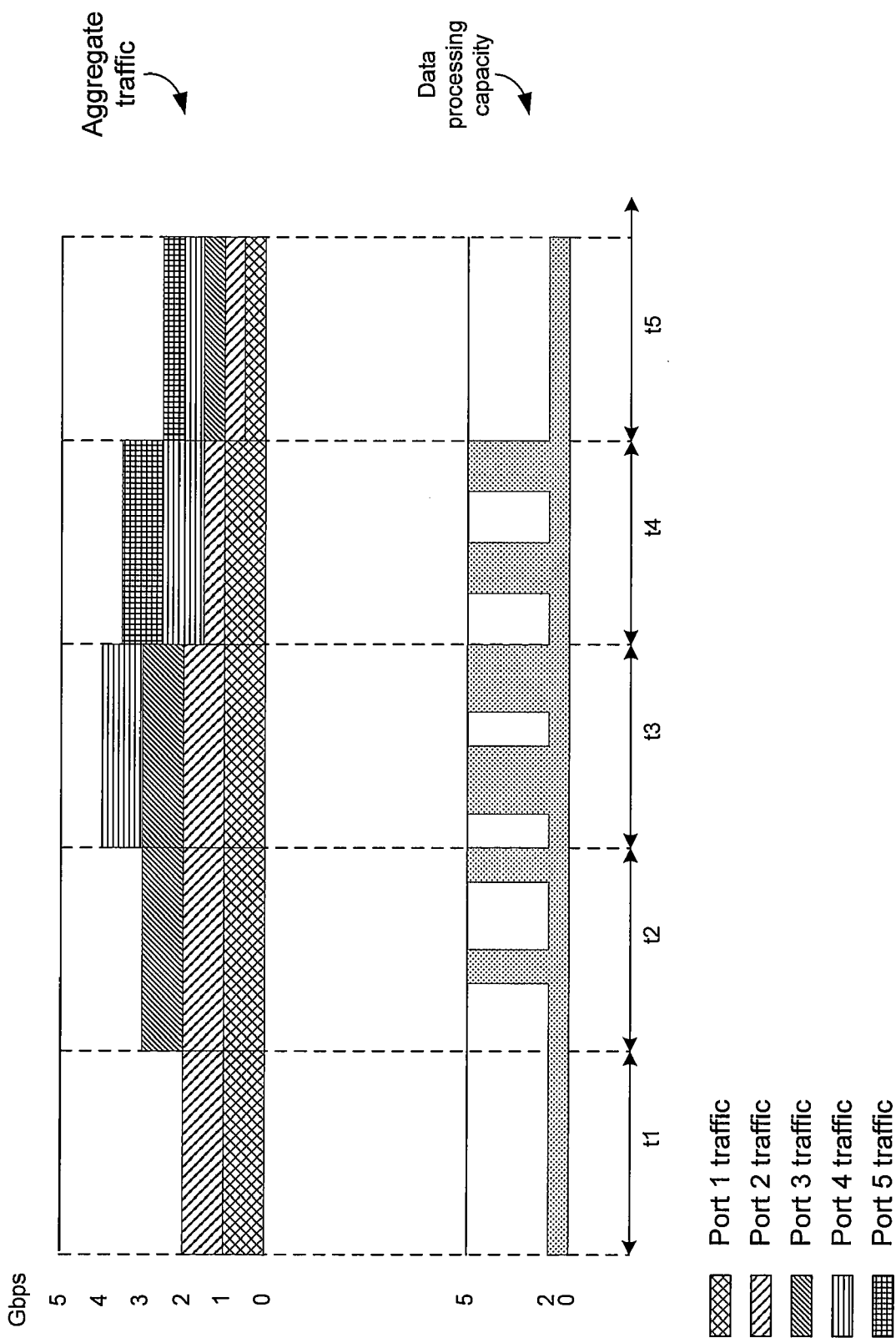
FIG. 2C is a diagram illustrating duty cycling one or more portions of a network device based on aggregate throughput of the device, in accordance with an embodiment of the invention.

FIG. 2C is a diagram illustrating duty cycling one or more portions of a network device based on aggregate throughput of the device, in accordance with an embodiment of the invention. Referring to FIG. 2C, in an exemplary embodiment of the invention, a device may comprise five ports which may each operate at 1 Gbps full-duplex (corresponding to a M.A.T of 5 Gbps) or 500 Mbps full-duplex, where 500 Mbps may be a non-standard data rate supported by each of the five ports. In this regard, 1 Gbps and 500 Mbps are only exemplary data rates and the invention is not so limited. To prevent corrupted or lost data, from overflowed or underflowed buffers, for example, the rate at which the device processes data, that is, the device's data processing capacity, may need to keep up with the combined ingress and egress data on the five ports. Accordingly, an aggregate throughput of a device's network ports may be utilized to control operation of one or more portions of the device. In this regard, one or more components, or portions thereof, of the device may be duty cycled during a time interval based on the aggregate throughput of the device during the time interval.

During the exemplary time interval t1, ports 1 and 2 may be operating at 1 Gbps and ports 2-5 may be idle and possibly disconnected. Thus, the limit on aggregate throughput of the device during time interval t1 may be 2 Gbps. Accordingly, one or more components, or portions thereof, of the device may be configured to handle 2 Gbps aggregate throughput for 100% of time interval t1. During the exemplary time interval t2, ports 1-3 may be operating at 1 Gbps and ports 4 and 5 may be idle and possibly disconnected. Thus, the limit on aggregate throughput of the device during time interval t2 may be 3 Gbps. Accordingly, one or more components, or portions thereof, of the device may be configured to handle 2 Gbps for 66.6% of time interval t2 and configured to handle 5 Gbps aggregate throughput for 33.4% of time interval t2. During the exemplary time interval t3, ports 1-4 may be operating at 1 Gbps. Thus, the limit on aggregate throughput of the device during time interval t3 may be 4 Gbps. Accordingly, one or more components, or portions thereof, of the device may be configured to handle 2 Gbps for 33.4% of time interval t2 and configured to handle 5 Gbps aggregate throughput for 66.6% of time interval t3. During the exemplary time interval t4, ports 1, 4 and 5 may be operating at 1 Gbps and port 2 may be operating at 500 Mbps, which may be a non-standard data rate supported by the device. Thus, the limit on aggregate throughput of the device during time interval t3 may be 3.5 Gbps. Accordingly, one or more components, or portions thereof, of the device may be configured to handle 2 Gbps for 50% of time interval t4 and configured to handle 5 Gbps aggregate throughput for 50% of time interval t4. During the exemplary time interval t5, ports 1 through 5 may each be operating at 500 Mbps. Thus, the limit on aggregate throughput of the device during time interval t5 may be 2.5 Gbps. Accordingly, one or more components, or portions thereof, of the device may be configured to handle 2 Gbps for 83.3% of time interval t5 and configured to handle 5 Gbps aggregate throughput for 17.7% of time interval t5.

Figure 3:
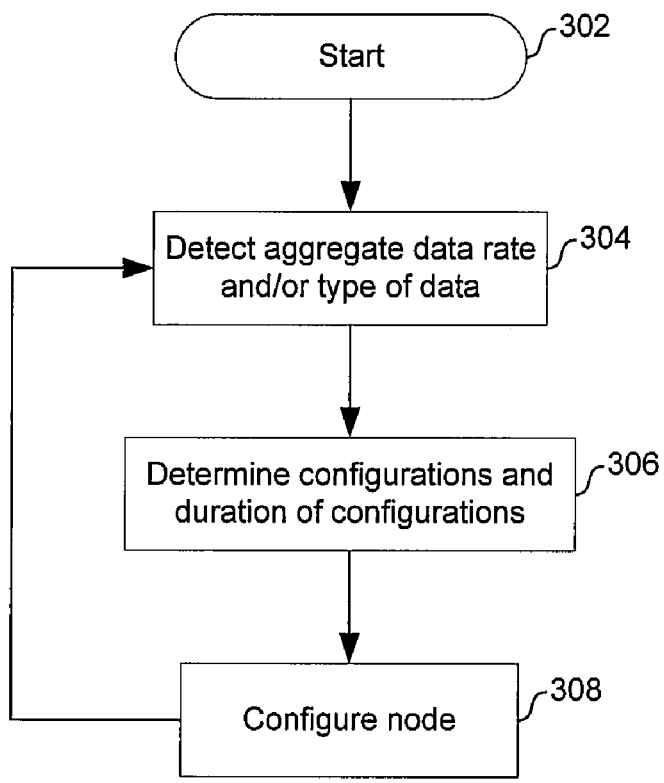
FIG. 3 is a flow chart illustrating exemplary steps for configuring portions of a network device based on an aggregate throughput a plurality of network links communicatively coupled to the network device, in accordance with an embodiment of the invention.

FIG. 3 is a flow chart illustrating exemplary steps for configuring a network device based on an aggregate throughput of the device, in accordance with an embodiment of the invention. For illustration, the exemplary steps are described with reference to the N-port device 100. Referring to FIG. 3, subsequent to start step 302 the exemplary steps may advance to step 304. In step 304, a limit on the aggregate throughput of the links $112_1, \ldots, 112_N$ during the time interval t1 may be determined. In this regard, a limit on the aggregate throughput of the links $112_1, \ldots, 112_N$ may be less than the maximum aggregate throughput supported by the device 100 for a variety of reasons. For example, one or more of the networking port subsystems 108 may not be connected to a network device 113, or may operate at a less than maximum speed due to limitations of a device 114 with which it is communicatively coupled. Additionally or alternatively, the data rate may be limited due to power requirements and/or a desire to conserve energy. In this regard, one or more techniques referred to as "Energy Efficient Ethernet" may be utilized to manage power consumption of the device 100 and may result in communications at less than a maximum supported data rate. For example, various variations of "low power IDLE" and/or "subset PHY" may be utilized. Subsequent to step 304, the exemplary steps may advance to step 306.

In step 306, duty cycling parameters may be determined. Exemplary parameters may comprise: which portions of the device 100 may be configured, which configuration(s) may be utilized, when one or more configurations may be utilized, and how long one or more configurations may be utilized. In this regard, various duty cycling parameters may be configured so as achieve desired data processing capacity(ies) and to prevent lost, corrupted, and/or critically delayed data. In some embodiments of the invention, a type of data may be considered or determined so as to, for example, mitigate the effects of latency. In some embodiments of the invention, a capacity of one or more memory elements utilized to, for example, buffer ingress and egress traffic at the device 100 may be taken into consideration when determining duty cycling parameters. In this regard, parameters for duty cycling the device 100 may be determined so as to prevent overflowing and/or underflowing buffers. Subsequent to step 306, the exemplary steps may advance to step 308.

In step 308, duty cycling of the device utilizing the parameters determined in step 306 may be implemented. In this regard, in order to prevent lost and/or corrupted data, a time instant at which to implement the new duty cycling parameters may be determined, and the device may be reconfigured at the determined time instant. Subsequent to step 308, the exemplary steps may return to step 304 and operate utilizing the parameters determined in step 306 until the completion of time interval t1 and/or t2.

Exemplary aspects of a method and system for duty cycling a network device based on aggregate throughput of the device are provided. In an exemplary embodiment of the invention, a limit on aggregate ingress and/or egress data of the network device 200 during a time interval may be determined. Processing of the data may be duty cycled based on the determination. The device 200 may process the data at a first rate during a first portion of a time interval and process the data at a second rate during a remaining portion of the time interval. In this regard, one or more components, or portions thereof, of the device 200 may be slowed or powered down during the first portion of the time interval. Exemplary components of the device 200 may comprise one or more network port subsystems 108, switch fabric subsystems 102, control and/or management subsystems 104, and/or hosts 152. In some embodiments of the invention, the device 100 may communicate utilizing Ethernet protocols. Additionally, power consumption of the device 100 may be managed utilizing one or more Energy Efficient Ethernet techniques such as "low power idle" and/or "subset PHY".

A duration of the time interval may be based on a type of the ingress and egress data. A duration of the time interval may be based on the limit on aggregate ingress and/or egress data of the network device 200 during the time interval. A duration of the first portion of the time interval may be based on the limit on aggregate ingress and/or egress data of the network device 200 during the time interval. Power consumed by the device during the first portion of the time interval may be less than power consumed by the device during the remaining portion of the time interval. The first data rate and the second data rate may each be determined based on the limit on aggregate ingress and/or egress data of the network device 200 during the time interval. An average rate at which the device processes data during the time interval may be equal, within a tolerance, limit on aggregate ingress and/or egress data of the network device 200 during said time interval.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for duty cycling a network device based on aggregate throughput of the device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   determining a limit on aggregate ingress and/or egress data, wherein:
      said data are aggregated over a plurality of ports of a network device, and
      said data are communicated via said plurality of ports of said network device during a time interval; and
   duty cycling processing of said ingress and/or egress data by said network device for each of said plurality of ports based on said determination, wherein an average rate at which said network device processes said ingress and/or egress data during said time interval is equal, within a tolerance, to said limit on aggregate ingress and/or egress data of said network device during said time interval.

2. The method according to claim 1, comprising powering down and/or slowing down one or more components, or portions thereof, of said network device during a portion of said time interval.

3. The method according to claim 1, comprising processing by said network device, said ingress and/or egress data at a first rate during a first portion of said time interval and at a second rate during a remaining portion of said time interval.

4. The method according to claim 3, comprising determining a duration of said time interval, said first portion of said time interval; and/or said remaining portion of said time interval based on one or more of:
   a type of said ingress and/or egress data; and
   said limit on aggregate ingress and/or egress data of said network device during said time interval.

5. The method according to claim 3, wherein power consumed by said network device during said first portion of said time interval is less than power consumed by said network device during said remaining portion of said time interval.

6. The method according to claim 3, comprising determining said first rate and said second rate based on said limit on aggregate ingress and/or egress data of said network device during said time interval.

7. The method according to claim 1, comprising disabling processing of said ingress and/or egress data by said network device during a first portion of said time interval and enabling processing of said ingress and/or egress data by said network device during a remaining portion of said time interval.

8. The method according to claim 1, wherein said network device communicates utilizing Ethernet protocols.

9. The method according to claim 1, wherein power consumption of said network device is managed utilizing one or more Energy Efficient Ethernet techniques.

10. A system for networking, the system comprising:
   one or more circuits in a network device, said one or more circuits operable to:
      determine a limit on aggregate ingress and/or egress data, wherein:
         said data are aggregated over a plurality of ports of a network device, and
         said data are communicated via said plurality of ports of said network device during a time interval; and
      duty cycle processing of said ingress and/or egress data by said network device for each of said plurality of ports based on said determination, wherein an average rate at which said network device processes said ingress and/or egress data during said time interval is equal, within a tolerance, to said limit on said aggregate ingress and/or egress data of said network device during said time interval.

11. The system according to claim 10, wherein said one or more circuits are operable to power down and/or slow down one or more components, or portions thereof, of said network device during a portion of said time interval.

12. The system according to claim 10, wherein said one or more circuits are operable to process said ingress and/or egress data at a first rate during a first portion of said time interval and process said ingress and/or egress data at a second rate during said remaining portion of said time interval.

13. The system according to claim 12, wherein said one or more circuits are operable to determine a duration of said time interval, said first portion of said time interval, and/or said remaining portion of said time interval based on one or more of:
   a type of said ingress and/or egress data; and
   said limit on aggregate ingress and/or egress data of said network device during said time interval.

14. The system according to claim 12, wherein power consumed by said network device during said first portion of said time interval is less than power consumed by said network device during said remaining portion of said time interval.

15. The system according to claim 12, wherein said one or more circuits are operable to determine said first rate and said second rate based on said limit on aggregate ingress and/or egress data of said network device during said time interval.

16. The system according to claim 10, wherein said network device does not process said ingress and/or egress data during a first portion of said time interval and processes said ingress and/or egress data during a remaining portion of said time interval.

17. The system according to claim 10, wherein said network device communicates utilizing Ethernet protocols.

18. The system according to claim 10, wherein power consumption of said network device is managed utilizing one or more Energy Efficient Ethernet techniques.

* * * * *